Dec. 6, 1966     C. VALDEZ     3,289,349
CURBING AND BORDERING MEANS
Filed Feb. 9, 1965
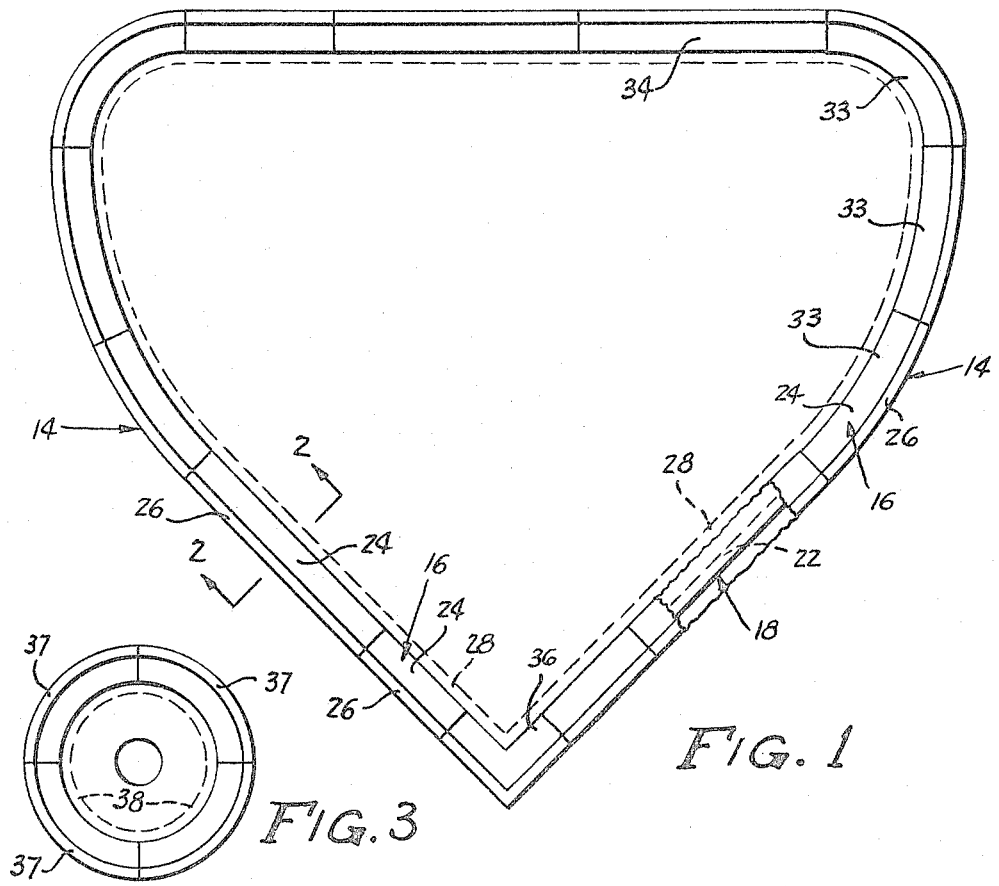
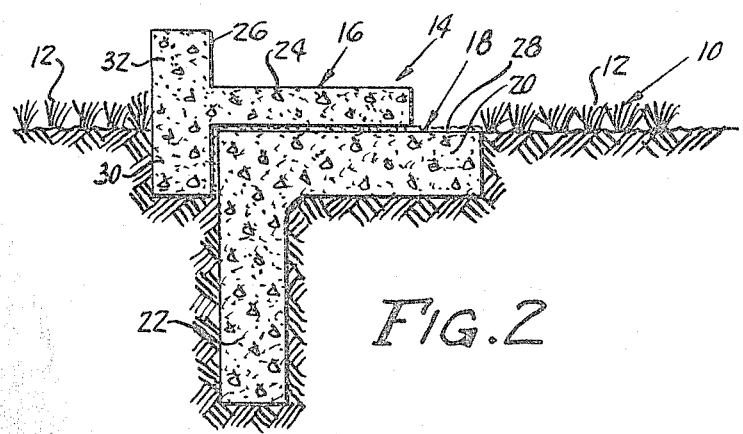
INVENTOR.
CRESENCIO VALDEZ
BY *Kimmel, Crowell & Weaver*
ATTORNEYS.

United States Patent Office 3,289,349
Patented Dec. 6, 1966

3,289,349
CURBING AND BORDERING MEANS
Cresencio Valdez, 151 Tesla, San Antonio, Tex.
Filed Feb. 9, 1965, Ser. No. 431,261
3 Claims. (Cl. 47—33)

The present invention relates to a curb or border means that can be used around flower beds, shrubbery, trees, gardens or in any manner desired in a yard or on a lawn.

It is an object of the present invention to provide a novel type of curb or border device that can be readily disposed in a yard or on a lawn without requiring skilled labor, and which curb once disposed in a yard will give many long, useful years of service without requiring replacement thereof.

It is another object of the present invention to provide a curb that can be used to border a flower bed and the like having a lower section that is disposed substantially within the soil and an upper section that projects or extends above the surface of the soil or ground.

It is another object of the present invention to provide a curb or bordering device that is made of two separate sections or portions and which sections or portions are constructed to mate with each other in a complementary fashion.

It is another object of the present invention to provide a curb that can be readily used around gardens, trees and flower beds that has upper and lower sections with the upper section disposed to be supported on the lower section so as to form a border for the area around which the curb is disposed.

It is still another object of the present invention to provide a curb for forming a border around a flower bed and the like with a top section that is made of light weight concrete or similar material and a lower section that is normally disposed within the soil except for its top surface upon which is disposed the top section which extends above the ground or soil and is readily removable from the lower section so that the grass can be mowed without the necessity of any type of trimming.

It is yet another object of the present invention to provide a novel type of curb that can be made in straight sections, curved or arcuate sections, and circular sections and consisting of an upper and a lower section with the lower section substantially positioned within the soil except for its top surface and the upper section supported on the lower section and projecting substantially above the lower section and separate therefrom so that the upper section can be readily removed when it is desired to mow the grass without the necessity of any type of trimming around the curb.

Various other objects and features of the invention will be readily apparent when considered in connection with the accompanying drawing forming a part thereof and the following detailed description and in which:

FIGURE 1 is a top plan view illustrating the invention embodied in the present invention;

FIGURE 2 is an enlarged section taken along the line 2—2 of FIGURE 1; and

FIGURE 3 is a top plan view of the invention shown with a circular configuration.

Referring to the drawing, the reference numeral 10 generally designates a piece of terrain or soil upon which is growing grass 12 as best seen in FIGURE 2.

In accordance with the present invention, a curb or border member generally designated 14, is disposed or positioned in the terrain or soil so as to form a perimeter or edger or border around flower beds, trees, gardens, bushes, shrubbery, or in any other manner desired in a yard. The curb consists of an upper section or portion 16 and a lower section or portion 18. The lower section 18 is made preferably of concrete and is substantially L-shaped having a horizontal leg 20 and a vertical leg 22. The upper section 16 is also preferably made of concrete and is substantially T-shaped with a horizontal leg 24 and a vertical leg 26 forming the top of the T. A hole is dug in the soil 10, as best seen in FIGURE 2, so that the vertical leg 22 of the lower section 18 extends into the ground and the horizontal leg 20 is also disposed below the ground level with its upper surface 28 substantially flush with the ground level.

The upper section 16 is disposed on top of the top surface 28 of the lower section 18 with the lower end of the vertical leg 26 disposed adjacent the upper side edge of the vertical leg 22 of the lower section and with this lower portion 30 of the leg 26 disposed below the ground level. The upper portion 32 of the leg 26 extends substantially above the ground level and together with the leg 24 of the upper section forms a curb or border around the perimeter of the area desired to be enclosed or edged by the curb.

In order to provide the border or curbing around the flower bed, tree or the like in a yard, after the holes have been properly dug and the lower section and the upper sectioned positioned in the soil with the upper section resting on the top surface 28 of the lower section, the curb or border requires very little maintenance, if any. When it is desired to mow the grass 12, it is only necessary to lift the upper section 16 from the lower section, placing it to one side of the area, after which the grass can be readily mowed without the necessity of any type of trimming.

It will be noted that the upper and the lower sections can be made of different shapes such as the curved shapes 33, shown in FIGURE 1, and the straight shapes 34 and even a V-shape therein. The curbing in FIGURE 1 is shown as being disposed in a substantially triangular configuration so as to enclose or border a triangular shape plot or area therein.

Referring to the curbing shown in FIGURE 3, it will be noted that this embodiment of the invention is substantially the same as that shown in FIGURE 1 except that the upper sections 37 and the lower sections 38 are substantially circular sections so as to enclose a circular area within their confines.

From the foregoing description, it is apparent that the present invention provides an economical curbing or border device made from light weight concrete and consisting of an upper and lower section that can be readily disposed or positioned in the soil so as to provide an ornate curb or border around the perimeter of the area enclosed. It will further be noted that the present invention provides an upper section of the curb that can be removed merely by picking it up and the grass can then be mowed without the necessity of any type of additional trimming. Since the curb is preferably made of concrete, it will withstand the elements and requires virtually no maintenance over a long period of time.

Inasmuch as various changes may be made in the form, location and relative arrangement of the several parts without departing from the essential characteristics of the invention, it will be understood that the invention is not to be limited except by the scope of the appended claims.

What is claimed is:

1. A curb for use in bordering an area of a garden and the like comprising a plurality of block members, each block member consisting of an upper removable section and a lower section for embedding in the soil, said lower section being an inverted L shape with the vertical leg extending downwardly in the garden soil and its horizontal leg having its upper surface disposed substantially at the level of the soil, said upper section being a T shape with the T being disposed horizontally with the bottom leg of the T seated on said upper surface and the lower half of the top leg of the T shape extending below the level of the soil and disposed adjacent the upper side of the vertical leg of said L shape section, and the upper half of the top leg of the T shape extending substantially above its bottom leg, and the horizontal leg of the L shape.

2. The curb of claim 1 wherein said plurality of block members are made of concrete and are disposed to enclose a triangular area and include straight block members and curved block members.

3. The curb of claim 1 wherein said plurality of block members are circular, are made of concrete and enclose a substantially circular area.

References Cited by the Examiner
UNITED STATES PATENTS

| | | | |
|---|---|---|---|
| 691,794 | 1/1902 | Morss | 94—31 |
| 806,563 | 12/1905 | Owen | 94—31 X |
| 813,334 | 2/1906 | Thomas | 94—32 |
| 1,726,222 | 8/1929 | Gregg | 94—31 |

ABRAHAM G. STONE, *Primary Examiner.*

PASQUALE A. RAZZANO, *Assistant Examiner.*